INVENTOR
Sophocles J. Dokos
BY George R. Clark
ATTORNEY

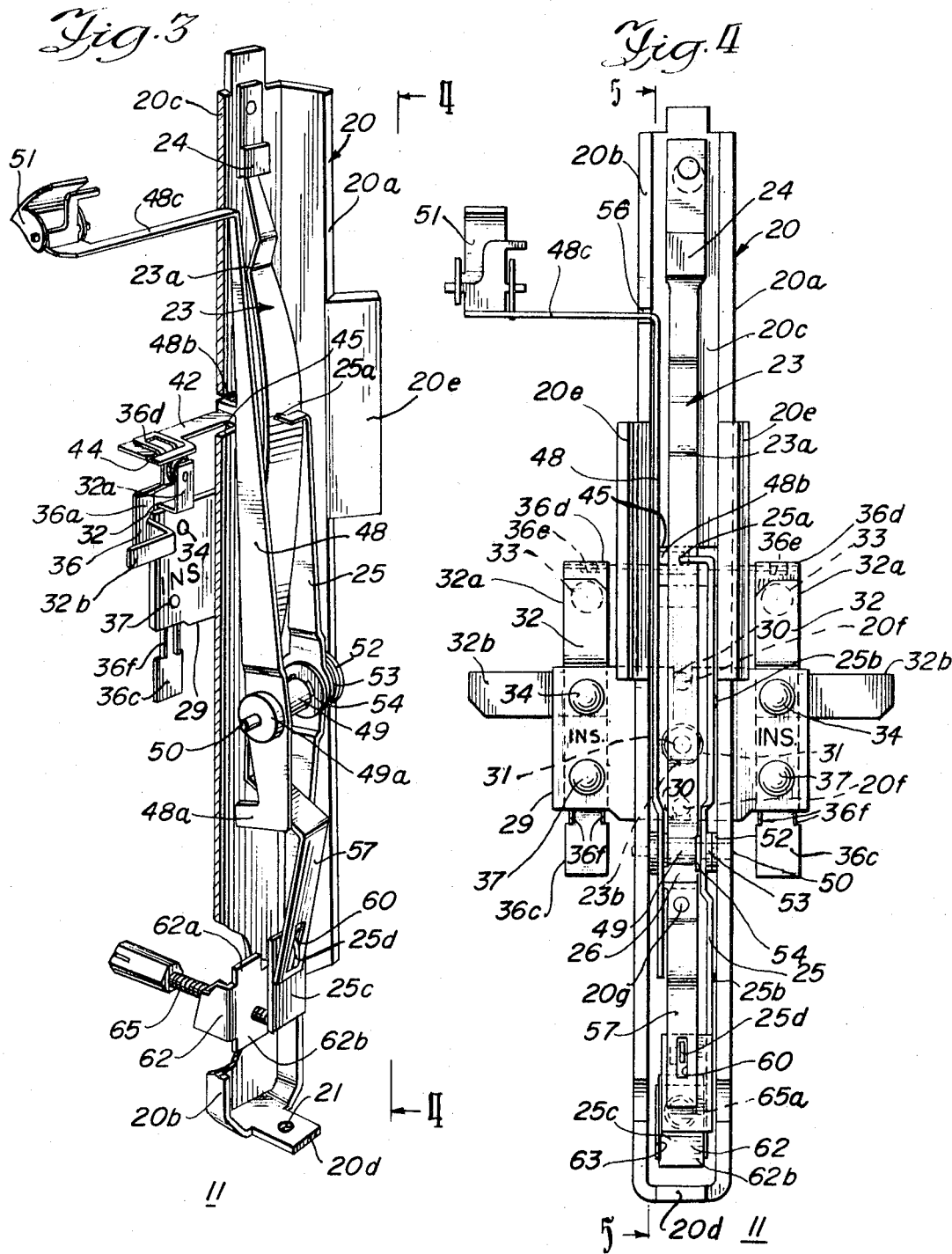

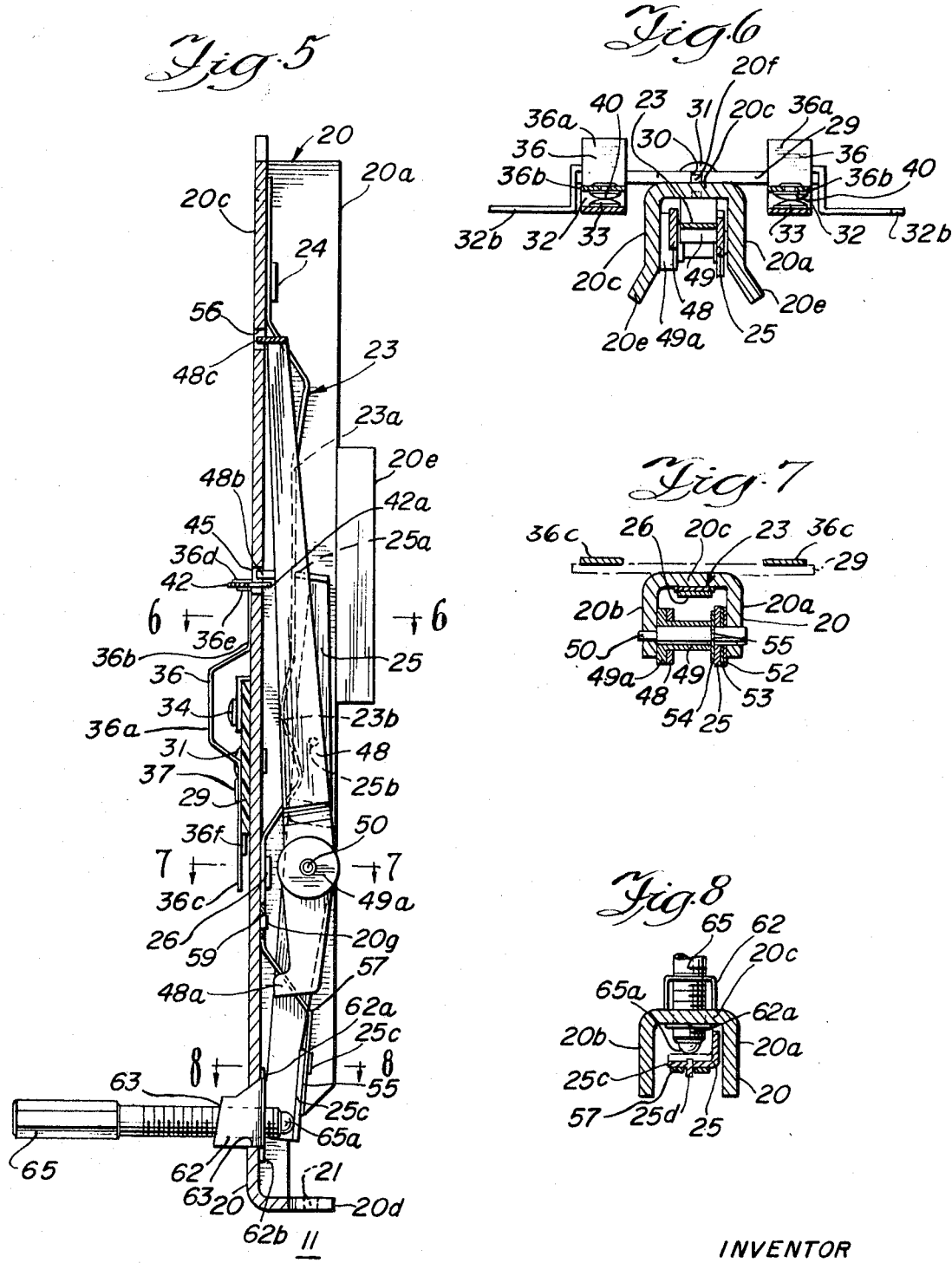

United States Patent Office 3,515,856
Patented June 2, 1970

3,515,856
TEMPERATURE RESPONSIVE CONTROL MEANS
Sophocles J. Dokos, Chicago, Ill., assignor to Sunbeam Corporation, Chicago, Ill., a corporation of Illinois
Filed Sept. 7, 1965, Ser. No. 485,479
Int. Cl. H05b 1/02
U.S. Cl. 219—493                                    9 Claims

ABSTRACT OF THE DISCLOSURE

A bimetallic toasting control means characterized by a unitary elongated channel shaped main supporting member formed of good heat conducting material.

A bimetallic thermostatic strip mounted in the channel shaped support in a snap acting mode with two stable control positions, wherein the inactive position is in direct contact with the channel shaped support to promote rapid cooling.

---

The present invention relates to temperature responsive control means and more particularly to an improved control means particularly useful for automatic toasters.

Automatic toasters for toasting bread slices and similar articles of the type wherein the toasting operation is begun by the operator and then carried out automatically are now widely accepted. One such automatic toaster is disclosed and claimed in Koci Pat. No. 2,667,828, granted Feb. 2, 1954, and assigned to the same assignee as the present application. The automatic toaster there disclosed is capable of going through its entire operation in response to the insertion of a bread slice into the toaster by the operator and includes means for moving the bread slice from a raised bread receiving position to a lowered toasting position for toasting the bread slice and for returning the toasted bread slice to the bread receiving position for convenient removal by the operator when toasted to the desired extent. Furthermore, the automatic toaster there disclosed includes a control means responsive principally to heat radiated from a predetermined area of the bread slice during toasting for terminating the toasting operation when the bread slice has been toasted the desired amount.

Although the control means disclosed in the above-mentioned Koci patent has been suitable for use with the automatic toaster described therein, it would be desirable to provide an improved control means for use with automatic toasters which is more compact, less expensive to manufacture and just as foolproof in operation.

Accordingly, it is an object of the present invention to provide a simplified and compact control means for automatic toasters.

It is another object of the present invention to provide an improved thermostat control for automatic toasters which is simple in construction and has substantially fewer parts than similar controls used in the past.

It is another object of the present invention to provide an improved temperature control means for automatic toasters comprising a simple unitary frame in the form of a channel-shaped support.

Still another object of the present invention is to provide an improved thermostatic control for automatic toasters wherein much of the mechanism of the thermostatic control is mounted compactly in a protected position within a single supporting member.

It is a still further object of the present invention to provide a thermostatic control for automatic toasters including a thermostatically controlled double pole switch for isolating the automatic toaster from both sides of a power source when the toaster is not energized.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

FIG. 3 is an enlarged perspective view of the control means in FIG. 1 with certain portions broken away more clearly to illustrate the invention;

FIG. 4 is an enlarged elevational view of the control means of the present invention looking in the direction of the arrows 4—4 of FIG. 3;

FIG. 5 is a sectional view taken on line 5—5 of FIG. 4;

FIG. 6 is a sectional view taken on line 6—6 of FIG. 5, assuming FIG. 5 shows the complete structure;

FIG. 7 is a sectional view taken on line 7—7 of FIG. 5 assuming FIG. 5 shows the complete structure;

FIG. 8 is a sectional view taken on line 8—8 of FIG. 5, assuming FIG. 5 shows the complete structure.

Briefly, the control means of the present invention comprises an assembly of parts including support means, bimetallic means, switch means, means for gathering radiant energy from the surface of an object being heated, such as a toasting bread slice, and supplying it to said bimetallic means, a reset lever, and color control means all mounted in a simple compact structure in a manner to protect the various parts thereof to the maximum extent. Specifically, it comprises a unitary elongated channel-shaped main supporting member formed of a good heat conducting material of substantial thickness. Supported within the elongated cavity or channel defined by this main supporting member is a bimetallic thermostatic strip restrained at both ends so that the center portion thereof has two stable positions, one with the center portion against the web of the channel, and the second with the center portion of the bimetallic element against stop means remote from said web. Pivotally mounted within the channel about a common pivotal axis are a reset lever for resetting the bimetallic element when it has snapped to its stable position against the web of the channel, and a color control lever defining the stop means for determining the other stable position of the center of the bimetallic strip. Manually adjustable means are provided for controlling the position of the color control lever which is biased by suitable spring means in one direction. This spring means is also housed within the channel. A double pole switch for interrupting the current flow in both conductors supplying electrical energy to the heating device with which the control means is associated is mounted on the channel, and switch actuating means are provided including a portion extending into the channel so as to be engaged by the bimetallic element. The double pole switch has contacts which are normally biased to the closed position and are adapted to be opened by snap action of the bimetallic element.

One application of the control means of the present invention is a replacement of the thermostat assembly disclosed beginning at the bottom of column 27 of Koci Patent No. 2,667,828. Although the control means of the present invention may be used whenever it is desired to terminate heating of an object when the surface temperature of such object reaches a predetermined value, in order to describe it fully it is portrayed as applied to a toaster.

Figure 1:
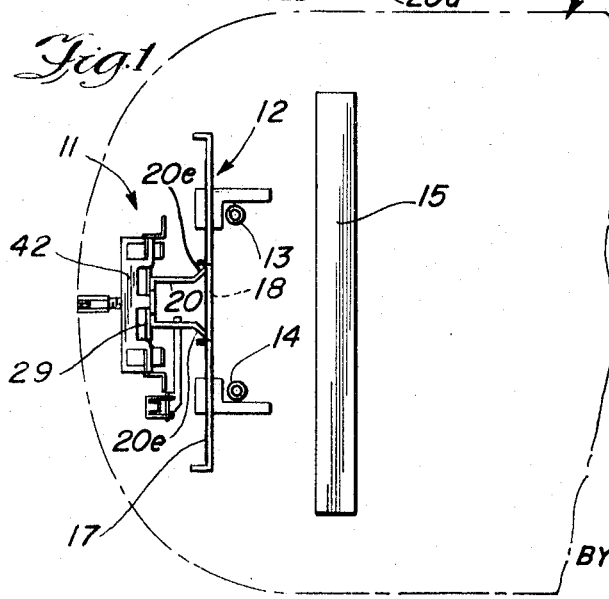
FIG. 1 is a fragmentary partly diagrammatic plan view of portions of an automatic toaster including control means constructed in accordance with the present invention to show how the control means may be employed in an electric toaster.
Figure 9:
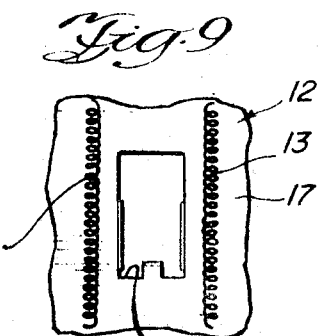
FIG. 9 is a somewhat schematic fragmentary elevational view of the reflector unit incorporated in the toaster shown in FIG. 1 viewed from the heater side thereof.

Referring now to the drawings, there is diagrammatically shown in FIGS. 1 and 9 an electric toaster generally designated at 10 which may be substantially identical with the toaster disclosed in the aforesaid Koci Pat. No. 2,667,828, the particular construction of this toaster forming no part of the present invention. In order to employ the control means of the present invention generally designated at 11, the toaster 10 preferably employs an end heating unit such as is disclosed in Koci Pat. No. 2,590,328, granted Mar. 25, 1952, and assigned to the same assignee as the present application. Such an end heating unit is generally designated by the reference numeral 12 (best shown in FIG. 9 of the drawings) and comprises spaced apart vertically disposed resistor elements 13 and 14 separated from each other by a substantial distance. These resistor elements each comprise a resistor wound in the form of an elongated spiral. The longitudinal axes of these resistor elements 13 and 14 are parallel with each other and are parallel with a bread slice, such as is indicated at 15 in FIG. 1 of the drawings, when disposed in a toasting position in toaster 10. Heating elements 13 and 14 are supported on a suitable combined reflector and supporting plate 17. In order that radiant energy from the adjacent surface of the object being heated, such as bread slice 15, can reach the control means 11 of the present invention, reflector and supporting plate 17 is provided with a suitable window 18 which may be identical with that shown in Koci Patent No. 2,667,828. The present invention is concerned with an improved and simplified control means operating in response to radiant energy transmitted from the surface of an object being heated capable of actuating a temperature responsive means to interrupt the energization circuit of the electrical heating elements heating such object.

In accordance with the present invention, there has been provided a single element which defines a thermostat housing, a reflector, a radiant energy guiding means, a cooling structure and a housing and support for a switch and switch control means. In this connection there is provided a U or channel-shaped support 20 comprising legs 20a and 20b and a bight portion or web 20c preferably formed of a relatively good heat conductor and of a thickness sufficiently great so as rapidly to conduct heat from end to end thereof. In a device built in accordance with the present invention, the thickness of the walls of the channel-shaped member 20 were in excess of sixty-five thousandths of an inch. In order that the channel-shaped member 20 may be mounted vertically, the legs 20a and 20b thereof terminate short of the lower end of the web 20c, and the end of web 20c is bent at right angles to provide a foot 20d having an opening 21 therein through which suitable fastening means may be inserted to secure the same to the base of the toaster. Heat energy collected by the heavy channel-shaped member 20 is rapidly conducted to the foot 20d and, hence, to means supporting the same for rapid dissipation. Consequently, the channel 20 comprises a relatively cool member as contrasted with other parts of the toaster with which the control means 11 is associated.

It will be appreciated that since the channel-shaped member 20 is intended to house a bimetallic element the open side of the channel 20 is directed toward the window 18 in the reflector 17, as shown in FIG. 1 of the drawings. For the purpose of insuring that all of the radiant energy from the adjacent surface of the bread slice 15 passing through the window 18 in reflector 17 enters the channel defined by member 20, the channel walls 20a and 20b over the area of the window 18 are provided with integral flared portions 20e. Preferably the flared portions 20e are adapted to extend to or partially into the window 18 so as to shield the interior of channel 20 from other than radiation transmitted from the surface of the bread slice.

Mounted within the channel-shaped member 20 and secured to the web portion 20c thereof is a radiant energy responsive device or thermostatic element 23 which may be substantially identical to the corresponding element shown in Koci Pat. No. 2,667,828 referred to above. The bimetallic element 23 comprises a single thermostatic strip properly varying in width from the ends thereof to the middle so as to obtain the right degree of compensating action with respect to the ambient temperature. This thermostatic element 23 is preferably of the type disclosed and claimed in Koci Pat. No. 2,332,518, granted Oct. 26, 1943, and assigned to the same assignee as the present application. The bimetallic element 23 has the ends thereof rigidly clamped to the web portion 20c of the channel 20 as by square-headed rivets 24 and 26, the square heads insuring a good clamping action over the entire width of the bimetallic element 23 and for a substantial length thereof. Clamping of the bimetallic element to the web portion 20c of the channel 20 is such as to subject the bimetallic strip 23 to a sufficient longitudinal compressive stress to obtain snap acting motion of the center of the strip. With this arrangement and the proper stress applied in the longitudinal direction, the bimetallic element is compelled to move with a snap action within its useful range of movement and to cause it to have stable positions only at substantially the extremes of its motion. In one extreme and stable position, the center section of the bimetallic element 23, which might be designated as the portion between points 23a and 23b (FIG. 2), engages the web 20c of channel-shaped member 20. This position is obtained in response to heating thereof to a relatively high temperature and might be called the high temperature position whereupon intimate contact of the center section of the bimetallic element 23 with the web 20c of channel 20 causes rapid cooling of the bimetallic element so that it may be moved to its other extreme position against an adjustably controlled stop designated at 25a and forming a part of a color control lever 25 described in detail hereinafter. The position of the stop 25a is adjustable for obtaining the desired color control in response to the position of the color control lever 25.

As is fully described in the above-mentioned Koci Pat. No. 2,667,828, the bimetallic element 23, by virtue of the compressive stress applied to the ends thereof, is unstable in any position thereof except its two extreme positions, namely, the position when the center thereof is against the adjustable stop 25a and the position when the center thereof is in engagement with the web 20c of the channel-shaped member 20. When the center of the bimetallic element 23 is heated to a sufficient extent, the inherent forces developed therein by virtue of such heating cause it to move away from the stop 25a if it is in engagement therewith so as to snap against the web 20c. Once the bimetallic element 23 has its center moved against the web 20c a manual force must be applied thereto to move it against the adjustable stop 25a where it will remain, assuming that the stop 25a is sufficiently away from the web 20c. Preferably the center of the bimetallic element 23 between the points 23a and 23b, which is the portion responsive to radiant energy from the bread surface, is coated so as to provide the surface of the bimetallic element with a high absorption coefficient for radiation of the type emitted from the toasted bread surface. Preferably also the bimetallic element is relatively thin so as to respond with a minimum time lag to a predetermined change in bread surface temperature. However, it must be of sufficient thickness to deliver the desired snap action energy to insure the actuation of a switch in a manner described hereinafter. It will be understood that the flared portions 20e, described above, are provided to insure that all of the energy obtainable from the bread surface through the window 18 will be directed to the central portion of the bimetallic element 23.

As in the above-mentioned Koci Pat. No. 2,667,828, the support 20 also functions as a support for a suitable switch mechanism. In accordance with the present invention, however, the switch mechanism, instead of involving a single pole switch, includes a double pole switch whereby both conductors of the power supply are interrupted, thus assuring that regardless of the polarity of the power line no portion of the toaster beyond the switch has voltage applied thereto.

The switch of the present invention comprises an insulating support 29, preferably formed of a glass laminate or similar sheet material, which is secured to the outside of the channel-shaped member 20 and specifically to the web 20c. For the purpose of securing the same to the channel 20 in a simple and inexpensive manner, the web portion 20c is preferably provided with a pair of spaced integral protuberances 20f (FIGS. 4 and 6) which are receivable in cooperating notches 30 (FIGS. 2, 4 and 6) defined in opposed edges of the insulating support 29. Thus by employing a single rivet 31, the insulating support 29 is rigidly secured to the channel 20.

Figure 2:
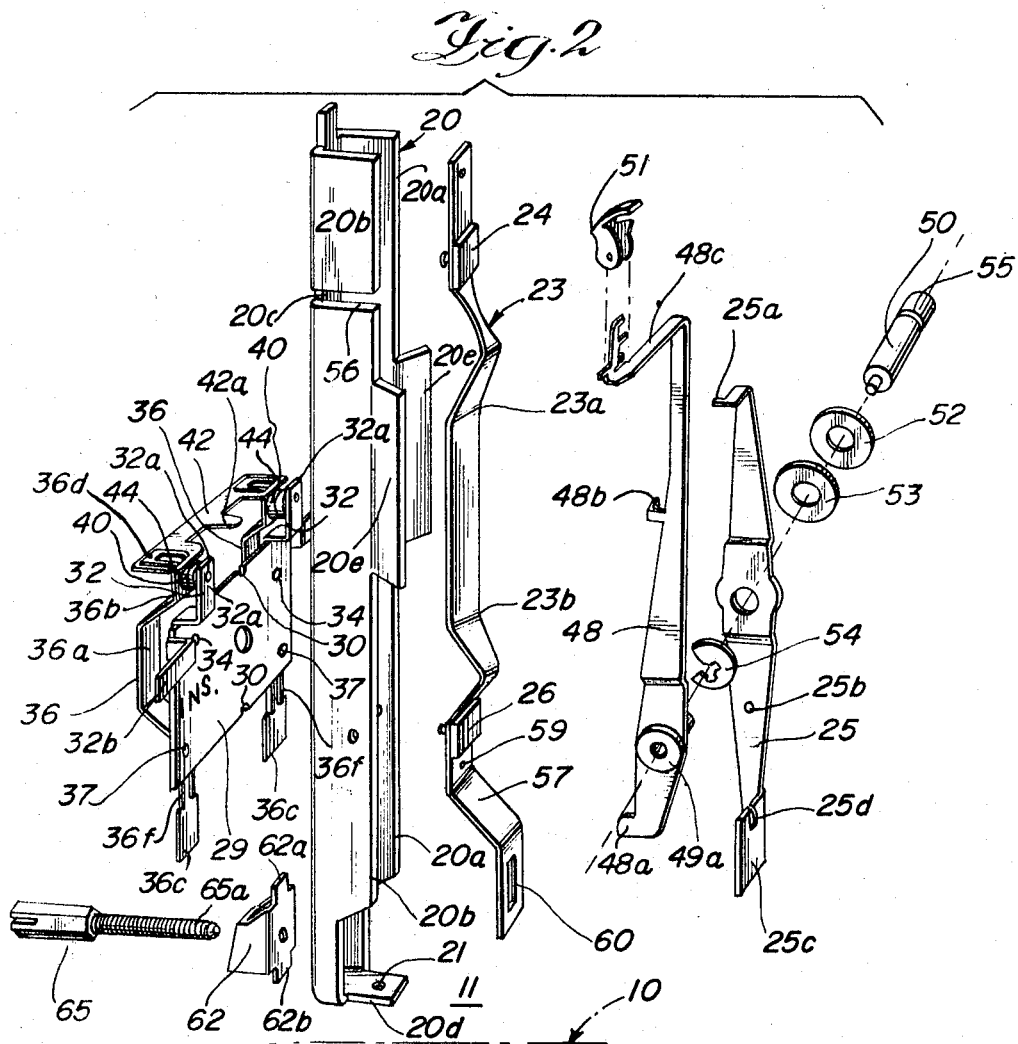
FIG. 2 is an enlarged somewhat diagrammatically shown exploded perspective view of the control means in FIG. 1.

In accordance with the present invention, insulating support 29 supports and insulates the two poles of a double pole switch, one on either side of the channel-shaped support 20. The construction of each pole of the double pole switch is identical and, hence, only one pole will be described in detail and corresponding parts of each will be designated by the same reference numerals. As illustrated, each switch pole comprises a somewhat L-shaped rigid switch bar 32, and these switch bars are secured in spaced relationship, one adjacent each upper corner of support 29. Each switch bar includes a first leg 32a extending in a generally parallel relationship with the longitudinal axis of the channel-shaped member 20, as best shown in FIG. 4 of the drawings. Mounted on each of the legs 32a adjacent the upper end is a stationary contact 33. The other leg 32b of the L-shaped switch bar extends laterally beyond the edge of support 29 and provides a simple means for making electrical connection with the stationary contact 33. A suitable rivet 34 is preferably employed to secure each L-shaped rigid conductor 32 to the insulating support 29. In order that a single rivet 34 may be sufficient to firmly secure each L-shaped switch bar 32 to support 29, each leg 32a and 32b of each switch or bus bar 32 is provided with a right angle bend immediately adjacent the corresponding edges of the insulating support, as best shown in FIGS. 2 and 3 of the drawings. Thus, each rigid conductor 32 engages the edges on both sides of the corner of the support 29 thus preventing rotation about the axis of rivet 34.

For the purpose of providing the movable contacts for the double pole switch comprising stationary contacts 33, there are provided a pair of resilient contact arms 36 which are each secured to the insulating support 29, so as to overlie the legs 32a, by means of a single rivet indicated at 37. Each resilient contact arm 36 includes a somewhat U-shaped central portion 36a, an upper contact supporting portion 36b extending above the upper edge of support 29 and a lower terminal portion 36c depending below the lower edge of support 29. Projecting laterally from the upper end of each portion 36b are spaced integral tabs 36d and 36e, the tab 36d projecting from the upper end of portion 36b and the tab 36e disposed slightly below tab 36d. What might be termed a movable contact 40 engageable with the associated stationary contact 33 is supported by portion 36b. In order that a single rivet 37 is sufficient to hold each resilient contact arm 36 to the support 29, deformed portions 36f are provided on each arm 36 immediately adjacent the lower edge of the support 29 so as to engage this edge, as clearly shown in FIGS. 3 and 4 of the drawings. This prevents rotation of arms 36 about the axes of rivets 37. The spring contact arms 36 are inherently resilient and tend to bias the movable contacts 40 to the closed position in contacting engagement with stationary contacts 33.

In order simultaneously to actuate the two poles of the double pole switch comprising the pair of movable contacts 40 and the pair of stationary contacts 33, there is provided an insulating switch actuating member 42 in the form of an elongated strip interconnecting the upper ends of portions 36b of resilient switch arm 36. To accomplish this interconnection member 42 is provided at each end with an end opening slit 44 for receiving therein the portion of 36b disposed between tabs 36d and 36e. Thus, there is provided a simple means of interconnecting the ends of the switch actuating member 42 and the resilient switch arms 36 insuring simultaneous actuation of both poles of the double pole switch.

So that the bimetallic element 23 disposed within the channel-shaped member 20 may actuate the double pole switch comprising the pair of movable contacts 40 and the pair of stationary contacts 33, the insulating switch actuator 42 is provided with an integral central finger 42a capable of projecting through an opening 45 defined in the web 20c of the channel-shaped member 20 (FIGS. 2, 3 and 5). The inherent resilience of the contact arms 36 tends to bias the double pole switch to the closed position and tends to cause the finger 42a to extend through the opening 45 into the path of movement of the center portion of the bimetallic element 23. When the bimetallic element 23 snaps against the web 20c, it, of course, engages the finger 42a and quickly moves the double pole switch to the open position. Simultaneously with the opening of this switch, the central portion of the bimetallic element 23 is cooled by contact with the web portion 20c of the channel-shaped member 20 so as to be ready for immediate resetting to its other stable position against the stop 25a thus permitting toasting of successive bread slices in quick succession, as fully described in the above-mentioned Koci Pat. No. 2,667,828. It will be appreciated that the four terminals of the double pole switch comprise the legs 32b of L-shaped conductors 32 and the portions 36c of resilient contact arms 36 which project beyond the edges of support 29 to permit ready connection of this switch into the energization circuit of the heating elements of the toaster 10.

As was mentioned above, the bimetallic element 23 when moved in response to heating of the central section thereof with a snap action against the web 20c of the channel-shaped member 20 to open the double pole switch described above will maintain this switch in the open position. In order to reclose the switch, means must be provided to force the center portion of the bimetallic element 23 away from the web 20c and against the stop 25a. To this end there is provided a pivotally mounted reset arm or lever 48 which, according to the present invention, has the major portion thereof housed within the chamber defined by the channel-shaped member 20. As illustrated in the drawings, the reset lever 48 is pivoted by means of a bushing 49 and a pivot pin 50 about the same pivotal axis as the lever 25. Bushing 49 is rigidly secured within an opening in lever 48 whereby an enlarged flange 49a on bushing 49 bears against one side of the lever 48 thus insuring accurate pivotal movement of lever 48. The lever 48 is provided with an integral projection 48a at the lower end thereof which acts as a stop member by engaging the web 20c to limit maximum clockwise rotation thereof, as viewed in FIG. 3 of the drawings. For the purpose of moving the bimetallic element 23 to its switch closed position, the lever 48 is provided with a finger 48b which extends between the center of the bimetallic element 23 and the web 20c. Upon clockwise rotation of the lever 48 about its pivotal axis, the finger 48b engages the bimetallic element and moves it to its other stable position against the stop 25a. The finger 48b is capable of being received within the opening 45 so that when the reset lever is in the position shown in FIGS. 3 and 5 of the drawings the finger 48b will permit the center portion of the bimetallic element 23 to snap against the web 20c of the channel-shaped member 20. The particular configuration of reset lever 48 is preferably such that the force of gravity normally pivots it to the position shown in FIGS. 3 and 4 of the drawings unless positively moved by some other force.

In order that the reset operation may be performed by means which might comprise the insertion of a bread slice into the toaster or any other manual operation, the upper end of the reset lever 48 is indicated as being provided with a lateral projection 48c which extends through a slit 56 in the side 20b of the channel-shaped member 20. In the particular embodiment illustrated in the drawings, a suitable trigger member 51 is pivoted to the free end of the lever 48c, which trigger member functions in the identical manner disclosed in Koci Pat. No. 2,667,828. Obviously, instead of the trigger member 51, any other suitable means for actuating the reset lever 48 to move the bimetallic element to a position permitting closing of the double pole switch may be employed.

Considering now the color control lever 25 which is provided to control the position of adjustable stop 25a, it too is mounted within the chamber defined by the channel-shaped member 20 and, consequently, is protected. This lever is pivotally mounted about the pivot pin 50 and preferably is rigidly secured to this pivot pin by being clamped between a pair of washers 52 and 53 and a retaining washer 54 adapted to be received within a groove 55 defined in the pivot pin. With this arrangement the lever is rigidly related to the pivot pin to insure proper functioning thereof. Preferably lever 25 is provided with a projection of small area designated as 25b adjacent flange 20a of channel-shaped member 20 for reducing to a minimum any friction between lever 25 and flange 20a. The stop 25a is, of course, an integral portion of the upper end of this pivot pin. It will be appreciated that the particular location of this stop will determine the position of the central portion of the thermostat in its stable position corresponding to the open position of the double pole switch described above.

In order selectively to adjust the position of stop 25a to furnish the desired color control when the control means of the present invention is employed in a toaster, the lower end of the lever 25 terminates in a lateral flange 25c of substantial area including an integral protuberance 25d projecting from this area. A suitable color control spring 57 formed of resilient strip material is disposed within the channel defined by channel-shaped member 20 with its upper end secured by the same square-headed rivet 25 that clamps the lower end of bimetallic element 23 to the web 20c. To prevent the color control spring 57 from rotating about the axis of the square-headed rivet 25, there is provided an inwardly directed projection 20g integral with the web 20c (FIG. 4) which enters an opening 59 (FIG. 2) in the spring 57. The lower end of the color control spring 57 is provided with an elongated slot 60 for receiving therein the protuberance 25d with the lower end of the spring engaging with the surface of the flange 25c. The inherent resilience of the spring 57 is such as to constantly bias the color control lever 25 in a clockwise direction about pivot 50, as viewed in FIGS. 2 and 3 of the drawings.

For providing a simple manual adjustment of the color control lever 25, there is provided an adjustment nut 62 receivable in an opening 63 in the lower end of web 20c, as best shown in FIG. 5 of the drawings. The nut 62 is preferably formed from sheet material and includes integral upper and lower tabs 62a and 62b which engage the upper and lower edges of the opening 63. A suitable adjusting screw 65 threadedly engages the nut 62. The screw 65 is provided with an end 65a engageable with the flange 25c on color control lever 25 on the opposite side thereof engaged by the spring 57. It will be apparent that color control spring 57 biases the flange 25c into engagement with the end 65a of adjusting screw 65, and there is thus provided a very simple arrangement to control the position of adjustable stop 25a. When the color control means of the present invention is used in a toaster, the adjusting screw 65 will project outside the toaster casing so as readily to be manipulated by the user, as will be well understood by those skilled in the art.

In view of the detailed description included above, the operation of the control means of the present invention will readily be understood by those skilled in the art. It will be apparent that there has been provided a very compact assembly which is easy to manufacture and the parts of which are almost fully enclosed within the channel-shaped support 20 to afford maximum protection for the parts. Moreover, most of the parts can be manufactured by simple stamping and punching operations and a greatly improved control means results.

While there has been illustrated and described only a single embodiment of the present invention, various changes and modifications will occur to those skilled in the art, and it is intended in the appended claims to cover all such changes and modifications as fall within the true spirit and scope of the present invention.

What is claimed as new and desired to be secured by Letters Patent of the United States is:

1. A temperature responsive device comprising rigid frame means shaped to define a housing, said frame means being formed entirely of good heat conducting material, a heat responsive element mounted within said housing and arranged to move from a sensing position to an inactive position when heated, said inactive position being one in which said heat responsive element is in engagement with said frame means, adjustable means mounted within said housing engageable with said element for determining the sensing position and the temperature at which said element moves from said sensing to said inactive position, and reset means mounted within said housing and engageable with said element for moving it from said inactive position to said sensing position thereby to reset said element.

2. A thermostatic control including in combination a frame defining a channel, said frame being formed entirely of good heat conducting material, a heat responsive thermostatic snap action element mounted within said channel and arranged to snap from a sensing position to an inactive position when heated, said inactive position being one in which said heat responsive element is in engagement with said frame means, adjustable means mounted on said frame engageable with said element for determining the sensing position and the temperature at which said element snaps from said sensing to said inactive position, and a reset lever movably mounted within said channel and engageable with said element for moving it from said inactive position to said sensing position thereby to reset said element.

3. A thermostatic control including in combination a frame defining a channel, said frame being formed entirely of good heat conducting material, a heat responsive thermostatic snap action element mounted within said channel and arranged to snap from a sensing position to an inactive position when heated, said inactive position being one in which said heat responsive element is in engagement with said frame means, adjustable means mounted within said channel engageable with said element for determining said sensing position and the temperature at which said element snaps from said sensing to said inactive position, and a reset lever movably mounted on said frame and engageable with said element for moving it from said inactive position to said sensing position thereby to reset said element.

4. In a thermostatic control, the combination of a frame defining a channel, said frame being formed of good heat conducting material, a heat responsive thermostatic snap action element mounted within said channel and arranged to snap from a sensing position to an inactive position when heated, said inactive position being one in which said heat responsive element is in engagement with said frame means, a pivot pin extending between opposed walls of said channel, an adjustment lever mounted within said channel for rotation about said pivot pin engageable with said element for determining the sensing position and the temperature at which said element snaps from the sensing to the inactive position, and a reset lever movably mounted within said channel and engageable with said element for moving it from said inactive position to said sensing position thereby to reset said element.

5. In a thermostatic control, the combination of a frame defining a channel, a heat responsive thermostatic snap action element mounted within said channel and arranged to snap from a sensing position to an inactive position when heated, a pivot pin extending between opposed walls of said channel, an adjustment lever mounted within said channel for rotation about said pin, said adjustment lever being engageable with said element for determining the sensing position and the temperature at which said element snaps from the sensing to the inactive position, and a reset lever movably mounted within said channel for rotation about said pin, said reset lever being engageable with said element for moving it from said inactive position to said sensing position thereby to reset said element.

6. A thermostatic control comprising a U-shaped frame having a bight portion and spaced wall portions, said frame being formed of good heat conducting material, a heat responsive thermostatic snap action element mounted between said wall portions and arranged to snap from a sensing position away from said bight portion to an inactive position against said bight portion when heated, an adjustment lever mounted between said wall portions and engageable with said element for determining said sensing position and the temperature at which said element snaps from said sensing to said inactive position, and a reset lever movably mounted between said wall portions and engageable with said element for moving it from said inactive position to said sensing position thereby to reset said element.

7. A thermostatic control comprising a frame defining a channel, a heat responsive thermostatic snap action element mounted within said channel and arranged to snap from a sensing position to an inactive position against said frame when heated, an adjustment lever mounted within said channel engageable with said element for determining the sensing position and the temperature at which said element snaps from said sensing to said inactive position, and a reset lever movably mounted within said channel and engageable with said element for moving it from said inactive position to said sensing position thereby to reset said element, said channel-defining frame being formed of heat conducting material of substantial thickness for rapidly cooling said element in said inactive position.

8. A thermostatic control for controlling a toaster having a heating element, said control including in combination a frame defining a channel, a heat responsive thermostatic snap action element mounted within said channel and arranged to snap from a sensing position to an inactive position when heated, an adjustment lever mounted within said channel engageable with said element for determining the sensing position and the temperature at which said element snaps from the sensing to the inactive position, a reset lever movably mounted within said channel and engageable with said element for moving it from said inactive position to said sensing position thereby to reset said element, a normally closed double pole switch mounted on said frame and connected between said heating element and a power source, and means for opening said switch upon movement of said element to said inactive position to isolate said heating element from the power source.

9. Apparatus for controlling a toasting cycle, said apparatus comprising heat dissipating supporting means, toast heating means mounted on said supporting means, a unitary channel-shaped frame formed of heat conducting material and including a web and spaced walls, said frame also including a mounting foot connected to said supporting means for rapid transfer of heat from said frame, a heat responsive thermostatic bimetal strip mounted between said walls in heat absorbing relation with respect to a toasting bread slice, said strip being mounted for snapping movement from a heat absorbing position spaced from said web to a heat releasing position against said web when heated, a pivot pin extending between said wall portions, a color control lever pivotally mounted on said pin for movement between said walls to one side of said strip and including a projection forming a stop determining said heat absorbing position of said strip, adjusting means for determining the position of said stop, a reset lever pivotally mounted on said pin for movement between said walls to the other side of said strip and including a projection engageable with said strip to move said strip to said heat absorbing position at the beginning of a toasting cycle, means defining an opening in said web beneath said strip, a normally closed double pole switch mounted to said web outside said frame and including a pair of movable contacts connected to control said toast heating means, and a switch actuator supported between said contacts and including a finger normally extending through said opening whereby said strip engages said finger to open said switch during said snapping movement.

References Cited

UNITED STATES PATENTS

| 2,361,162 | 10/1944 | Arnold | 337—348 |
| 2,392,407 | 1/1946 | Purpura | 337—335 |
| 2,427,946 | 9/1947 | Blosser et al. | 337—347 |
| 2,667,828 | 2/1954 | Koci. | |

BERNARD A. GILHEANY, Primary Examiner

F. E. BELL, Assistant Examiner

U.S. Cl. X.R.

337—345, 347